(12) United States Patent
Masuda et al.

(10) Patent No.: US 7,386,332 B2
(45) Date of Patent: Jun. 10, 2008

(54) MOBILE TERMINAL DEVICE

(75) Inventors: Kozo Masuda, Yokohama (JP); Ikuya Arai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 10/888,335

(22) Filed: Jul. 9, 2004

(65) Prior Publication Data
US 2005/0176471 A1 Aug. 11, 2005

(30) Foreign Application Priority Data
Feb. 5, 2004 (JP) .............................. 2004-028797

(51) Int. Cl.
*H04M 1/00* (2006.01)

(52) U.S. Cl. ................ 455/575.4; 455/566; 455/550.1; 455/90.3; 455/3.06; 345/531; 345/211; 345/214; 345/169; 361/687; 361/715

(58) Field of Classification Search ................ 455/566, 455/575.1–575.9, 550.1, 90.1–90.3, 3.01–3.06, 455/556.2; 345/169, 101, 531, 211–214; 348/725; 361/687, 714–715, 683, 727, 752, 361/814
See application file for complete search history.

(56) References Cited

U.S. PATENT DOCUMENTS

| | | | | |
|---|---|---|---|---|
| 4,897,835 A * | 1/1990 | Gaskill et al. ................ 370/314 |
| 5,029,236 A * | 7/1991 | Yasuda et al. ............. 455/575.9 |
| 5,491,838 A * | 2/1996 | Takahisa et al. ............ 455/3.06 |
| 5,519,886 A * | 5/1996 | Gilbert et al. ............ 455/115.1 |
| 5,583,979 A * | 12/1996 | Sonohara et al. ............ 345/473 |
| 5,689,654 A * | 11/1997 | Kikinis et al. .............. 710/303 |
| 5,850,612 A * | 12/1998 | Kulberg et al. ........... 455/575.7 |
| 6,208,874 B1 * | 3/2001 | Rudisill et al. ........... 455/575.4 |
| 6,275,714 B1 * | 8/2001 | Kintz et al. ................. 455/566 |
| 6,308,084 B1 * | 10/2001 | Lonka ...................... 455/556.1 |
| 6,459,906 B1 * | 10/2002 | Yang ........................ 455/556.1 |
| 6,556,811 B1 * | 4/2003 | Sayers et al. .............. 455/90.3 |
| 6,832,105 B2 * | 12/2004 | Okawa ........................ 455/566 |
| 6,897,850 B2 * | 5/2005 | Sugimoto ................... 345/169 |
| 7,119,851 B2 * | 10/2006 | Ono ........................... 348/581 |
| 7,120,470 B2 * | 10/2006 | Oota et al. .................. 455/566 |
| 2003/0139142 A1 * | 7/2003 | Wang ........................ 455/67.1 |
| 2004/0072589 A1 * | 4/2004 | Hamamura et al. ....... 455/550.1 |
| 2004/0130869 A1 * | 7/2004 | Fleck et al. ................. 361/687 |
| 2004/0203496 A1 | 10/2004 | Bae et al. |
| 2005/0054372 A1 * | 3/2005 | Tsuda et al. ............. 455/550.1 |

FOREIGN PATENT DOCUMENTS

| | | |
|---|---|---|
| JP | 2001-230578 | 8/2001 |
| JP | 2002-271049 | 9/2002 |
| JP | 2003-319390 A | 11/2003 |

* cited by examiner

*Primary Examiner*—Sharad Rampuria
(74) *Attorney, Agent, or Firm*—Townsend and Townsend and Crew LLP

(57) ABSTRACT

A mobile terminal device comprises a first case including display unit, and a second case arranged so as to slide with respect to the first case and including input unit. The mobile terminal device further comprises a heat radiation member for radiating heat generated in the first case or in the second case. The heat radiation member has a surface area exposed outside which is changed in connection to the slide operation of the first and the second case.

3 Claims, 7 Drawing Sheets

MOBILE TERMINAL DEVICE

INCORPORATION BY REFERENCE

The present application claims priority from Japanese application JP2004-028797 filed on Feb. 5, 2004, the content of which is hereby incorporated by reference into this application.

BACKGROUND OF THE INVENTION

This invention relates to a mobile terminal device.

Conventionally, there has been suggested a mobile communication terminal having such a heat radiation structure that the heat generated from electronic parts is transferred by a member having a preferable thermal conductivity and radiated by a heat sink arranged outside (for example, see JP-A-2001-230578, page 3, FIG. 2).

Moreover, there has been suggested a mobile electronic device having a case whose part can be slidably moved so as to expose the inner heat sink outside, thereby radiating the heat (for example, see JP-A-2002-271049, pp. 3-4, FIG. 3).

However, the invention of the aforementioned JP-A-2001-230578 has a problem that the heat sink is exposed at the external protruding portion and cannot be appropriately placed in a bag or a pocket. Moreover, there is a case that this deteriorates the appearance.

Moreover, the invention of the aforementioned JP-A-2002-271049 has a problem that the area of the heat sink which can be exposed outside by opening a part of the case is relatively small and the heat radiation effect is limited. Moreover, since the slide operation is not interlocked with the normal operation (such as screen opening/closing operation), a user should perform the slide operation to expose the inner heat sink outside in addition to the normal use operation, which complicates the operation. Furthermore, this JP-A-2002-271049 describes only a mobile electronic device collapsibly connecting a case having a display section and a case having an input section and does not disclose one slidably connecting the case having the display section and the case having the input section. Accordingly, it is assumed that the device is used with the both cases collapsibly connected being opened and no description is given on the problem that heat is accumulated when the device is used with the cases slidably connected being closed.

SUMMARY OF THE INVENTION

It is therefore an object of this invention to solve the aforementioned problems and provide a mobile terminal device capable of reducing the heat accumulation.

In order to solve the aforementioned problems, this invention provides a mobile terminal device comprising: a first case including display unit, and a second case arranged so as to slide with respect to the first case and including input unit, the mobile terminal device further comprising a heat radiation member for radiating heat generated in the first case or in the second case, wherein the heat radiation member has a surface area exposed outside which is changed in connection to the slide operation of the first case and the second case.

This invention can provide a mobile terminal device capable of reducing heat accumulation.

Other objects, features and advantages of the invention will become apparent from the following description of the embodiments of the invention taken in conjunction with the accompanying drawings.

DESCRIPTION OF THE EMBODIMENTS

Description will now be directed to embodiments of this invention with reference to the drawings. This invention can be applied mobile terminal devices in general such as a mobile telephone, a PHS, a PDA, a notebook type PC, a mobile TV, and a mobile video recording device/reproduction device. However, the mobile telephone will be described here as an example.

The first embodiment of this invention will be described with reference to the drawings.

Figure 1:
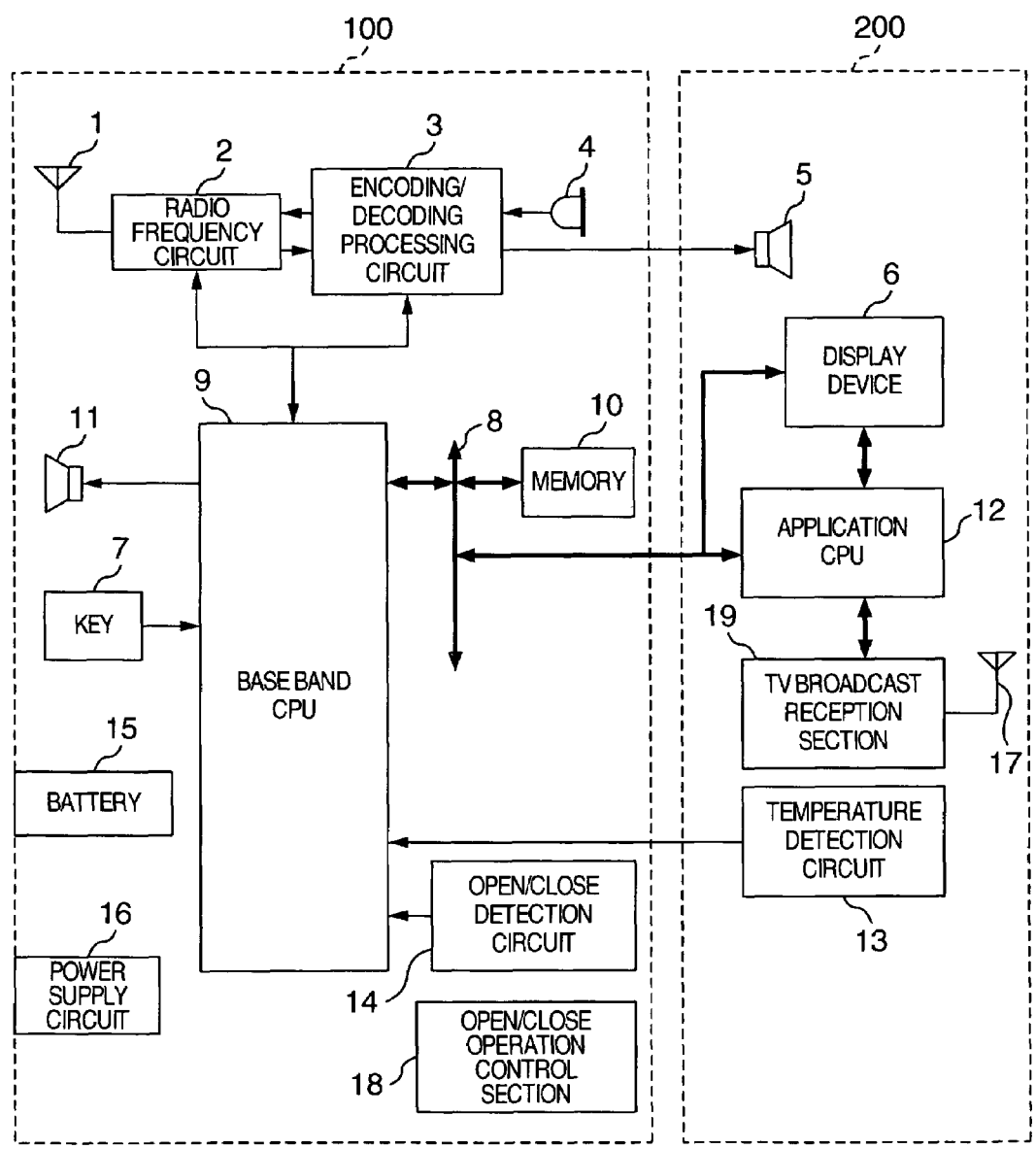
FIG. 1 shows configuration of a communication terminal device according to a first embodiment of this invention.

FIG. 1 is a block diagram showing configuration of a mobile telephone. In the figure, the mobile telephone includes an antenna 1, a radio frequency circuit 2, a code decoding circuit 3, a microphone 4, a receiver 5, a display device 6, a key 7, a CPU bus 8, a base band CPU 9, a memory 10, a loudspeaker 11, an application CPU 12, a temperature detection circuit 13, an open/close detection circuit 14, a battery 15, a power supply circuit 16, a TV broadcast reception antenna 17, an open/close operation control section 18, and a TV broadcast reception section (tuner) 19. A reference symbol 100 denotes a lower substrate and 200 denotes an upper substrate The upper substrate is mounted in the upper case and the lower substrate 100 is mounted in the lower case of the slide type mobile telephone shown in FIG. 2.

Hereinafter, each of the components will be described.

The antenna 1 receives an electric wave transmitted through the air, converts it into a high-frequency electric signal, and inputs it into the radio circuit 2. Moreover, the antenna 1 converts the high-frequency electric signal output from the radio circuit 2 into an electric wave and transmits it.

According to the instruction of the base band CPU 9, the radio circuit 2 demodulates the high-frequency electric signal received by the antenna 1 and inputs it into the code decoding circuit 3. Moreover, the radio circuit 2 subjects the output signal of the code decoding circuit 3 to modulation processing, converts it into a high-frequency electric signal, and outputs it to the antenna 1.

According to control of the base band CPU 9, the code decoding circuit 3 subjects the output signal of the radio circuit 2 to decoding processing, outputs a communication speech signal to the receiver 5, and outputs characters and image data to the base ban d CPU 9. Moreover, speech input from the microphone 4 or characters and image data edited by a user operating the key 7 as an input section are subjected to coding processing.

The base band CPU 9 performs processing of talking/communication in general. For example, the base band CPU 9 acquires a program from the memory 10 via the CPU bus 8 and controls the code decoding circuit 3, the radio circuit 2, and the antenna 1 for waiting for ringing. When ringing occurs, a ringing sound such as an alarm or melody is generated from the loudspeaker 11 to notify the user that ringing has occurred and the source telephone number or electronic mail address is displayed on the display device 6 via the CPU bus 8. Moreover, the picture information or audio information compressed and received by the antenna 1 is output to the application CPU 12 via the CPU bus 8.

The application CPU 12 performs processing of picture information and audio information. For example, the picture information and the audio information output from the base band CPU 9 are subjected to decompression. The picture information is output to the display device 6 and displayed there. The audio information is returned to the base band CPU 9 and reproduced by the loudspeaker 11. Moreover, the television signal input from the TV broadcast reception section 19 is subjected to separation processing to separate the picture information from the audio information. The picture information is output to the display device 6 and displayed there. The audio information is returned to the CPU 9 and reproduced by the loudspeaker 11.

Thus, by decompressing the picture and audio information which have been compressed by the application CPU 12, it is possible to reduce the processing load on the base band CPU 9 and to display picture by improving the image accuracy and quality and reproduce audio information of high quality.

The display device 6 displays data output from the base band CPU 9 and application CPU 12. FIG. 1 shows an example having two inputs: the CPU bus 8 of the base band CPU 9 and the bus of the application CPU 12. However, it is also possible to use one input. That is, when the application CPU 12 has a function to go through the inside of the CPU 8, there is no need of the bus of the application CPU 12 and it is possible to use only the CPU bus 8. This can reduce the circuit size and power consumption.

The temperature detection circuit 13 includes a thermistor and a thermocouple for detecting the temperature of the vicinity of the application CPU 12 and reports the temperature to the base band CPU 9 from time to time.

The open/close detection circuit 14 detects the open/close state of the slide type mobile set (upper case and lower case) by using a mechanical or magnetic switch and reports the set open/close state to the base band CPU 12.

The battery 15 is a secondary battery rechargeable such as lithium-ion or NiMH battery which supplies power to each component of the mobile telephone for operation.

The power supply circuit 16 generates and supplies voltage required by the respective components, according the power supplied from the battery 15. Moreover, when the remaining amount of the battery 15 has become small, the battery 15 is charged by power supplied from a home receptacle or car battery.

The TV broadcast reception section 19 extracts a channel electric wave, converts it into a digital signal, and inputs it into the application CPU 12.

The TV broadcast to be received may include analog broadcast and digital broadcast.

The open/close operation control section 18 controls open/close operation of the upper case 201 and the lower case 101. For example, when an instruction to open the set is issued from the base band CPU 9 while the upper case 201 and the lower case 101 are in the closed state, control is made to open the upper case 201 and the lower case 101.

Figure 2A:
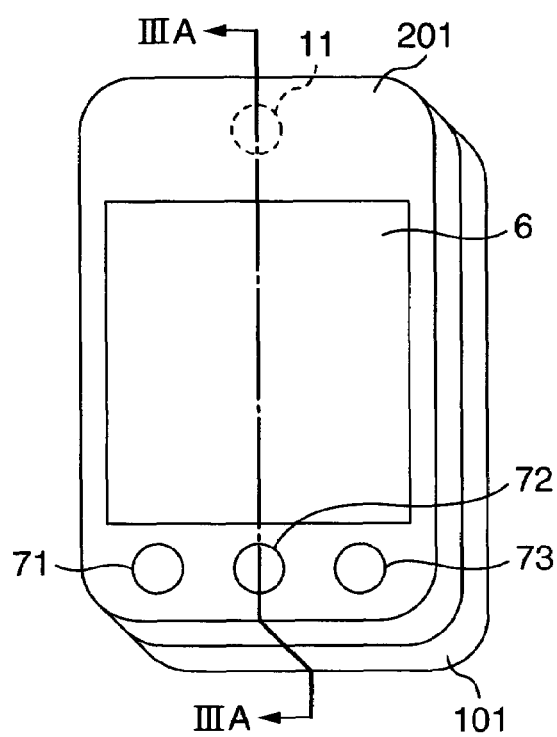
FIGS. 2A and 2B are external views of the terminal device according to the first embodiment of this invention.
Figure 2B:
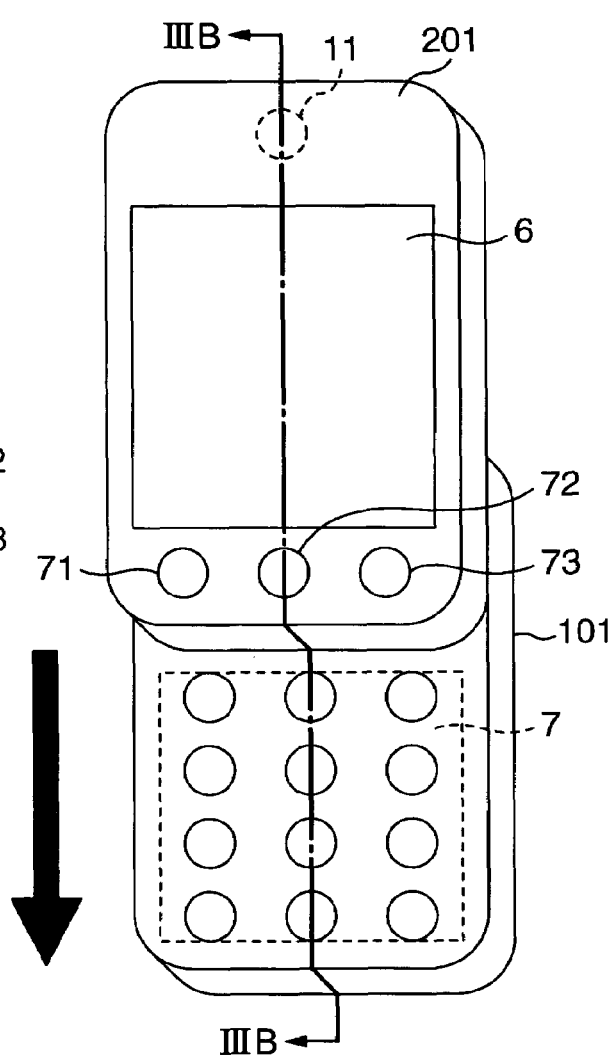

FIGS. 2A and 2B are external views of the mobile telephone according to the present invention. Like components as in FIG. 1 are denoted by like reference symbols and their explanations are omitted.

FIG. 2A shows the set in the closed state. 201 designates the upper case, 101 the lower case, 71 an upper direction key, 72 a decision key, and 73 a lower direction key. In the mobile telephone according to this invention, the display device 6 is arranged at the outer side of the upper case 201 so that it can be seen even when the set is in the closed state. Moreover, the keys 71 to 73 are arranged on the same plane. Even when the set is in the closed state, the talking function (for example, talking in response to ringing), the communication function (for example, call a telephone number registered in the address notebook, read a WEB page, receive a mail) and other main function used with a high frequency (for example, read data recorded in the memory 19) can be performed.

FIG. 2B shows the set in the open state. The set is opened by pulling out the lower case 101 in the direction of the arrow. When the set is opened, the keys 7 which have been concealed by the upper case are exposed to the operator and detailed operation (such as mail creation) can be performed as compared when the set is in the closed state.

It should be noted that the set in the closed state means that the upper case 201 and the lower case 101 are closed. More specifically, as shown in FIG. 2A, the closed state includes cases that the upper case 201 and the lower case 101 are made to slide with each other so that the cases are superimposed almost over the all the surface, that the keys of the lower case 101 are concealed by the upper case 201, and that the upper case and the lower case are made to slide so that the entire length of the set is made short. Moreover, the set in the open state indicates that the upper case 201 and the lower case 101 are opened. More specifically, as shown in FIG. 2B, the open state includes cases that the upper case 201 and the lower case 101 are made to slide with each other so that the cases are only partially overlapped, that the keys of the lower case 101 are exposed, and that the upper case and the lower case are made to slide so that the entire length of the set is made longer.

Figure 3A:
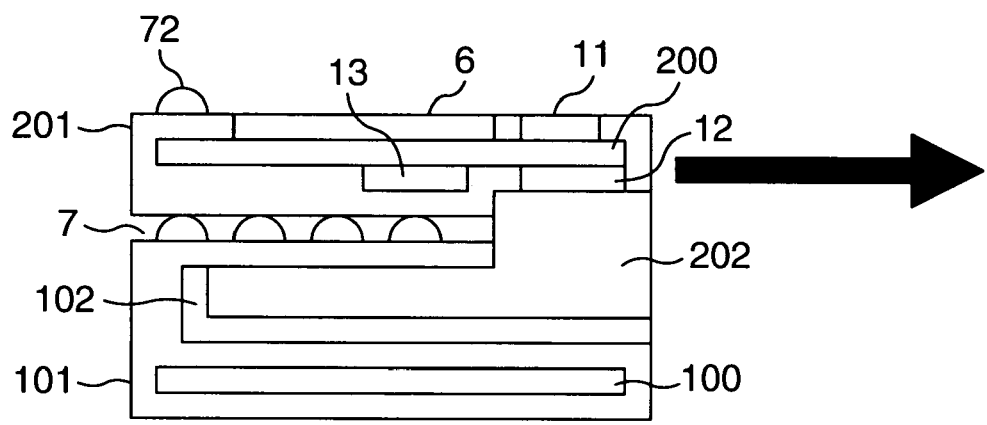
FIGS. 3A and 3B are cross-sectional views of the terminal device according to the first embodiment of this invention.
Figure 3B:
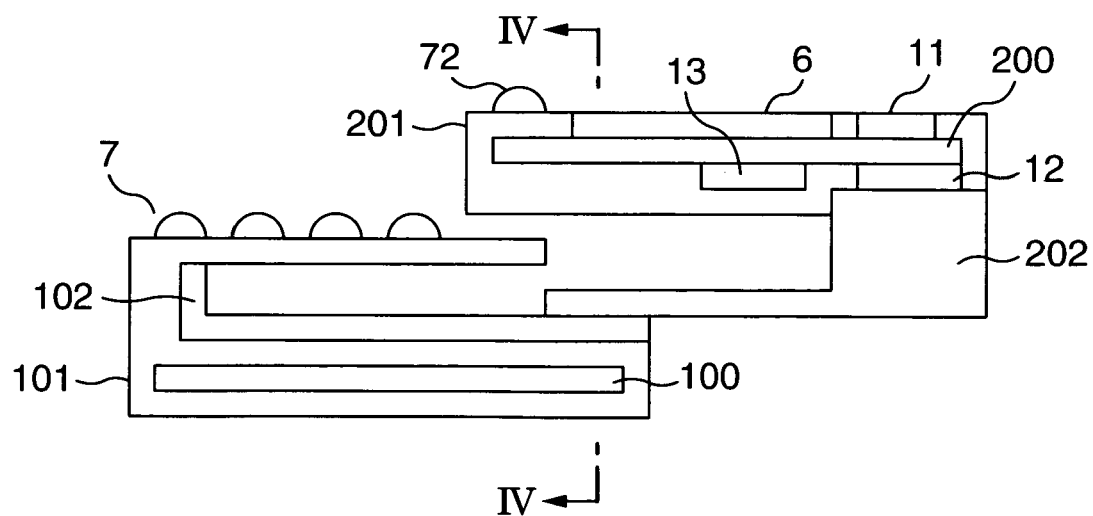

FIGS. 3A and 3B are a cross-sectional views of the mobile telephone according to this invention. More specifically, FIG. 3A is a cross-sectional view of FIG. 2A about (A)-(A') and FIG. 3B is a cross-sectional view of FIG. 2B about (B)-(B'). With reference to these drawings, internal mechanical structure will be described. Like components as in the aforementioned figures are denoted like reference symbols and their explanations are omitted.

FIG. 3A is a cross-sectional view of the set in the closed state. 202 designates an upper heat sink and 102 a lower heat sink. These are made from a material having a high thermal conductivity such as a metal (for example, aluminum), carbon, and plastic and configured so that the inner heat is effectively radiated outside.

In FIG. 3A, the upper substrate 200 is arranged at the center of the upper case 201. On the upper side of this upper substrate 200, the display device 6 is arranged so as to be exposed from the case 201. The receiver 11 is arranged adjacent to it. Moreover, at the lower side of the upper substrate 200, the application CPU 12 and its package are arranged, to which the upper heat sink 202 is attached, so that heat generated from the application CPU 12 is radiated by the upper heat sink 202.

The reason why the application CPU 12 is attached to the upper heat sink 202 is that the application CPU 12 performs recording processing and reproduction processing of picture information and audio information (such as MPEG, JPEG, MP3 file compression/decompression), i.e., a great amount of calculations and requires a large CPU power. The application CPU 12 executes the following processes. As examples of image processing executed by the application CPU 12, there are recording/reproduction of a moving picture of the TV broadcast received, recording/reproduction of a moving picture received during TV telephone call, recording/reproduction of a still image picked up by a built-in camera (not depicted), reproduction of a moving picture/still image recorded in the memory 10, and reproduction during a game play. Moreover, as examples of audio information processing executed by the application CPU 12, there are recording/reproduction of the audio of the TV broadcast received, recording/reproduction of audio received during TV telephone call, and reproduction of audio recorded in the memory 10. These require a great amount of calculation and a large CPU power.

That is, in order to improve the CPU power, it is necessary to increase the speed of the CPU operation frequency. However, this is accompanied by heat generation. When the heat generation is small or the heat generation time is short, there is no problem. However, when a great amount of heat is generated for a long period of time, there arises a danger that the allowable operation temperature range of the parts mounted on the set may be exceeded. Especially in the case of the sliding type mobile telephone, unlike the collapsible type mobile telephone, it is possible to view a TV broadcast and reproduce a moving picture on the display screen (main screen) while the set is in the closed state and there is a problem that the heat generated inside is not easily radiated outside. Accordingly, when a user vies a TV broadcast for a long time, the heat generated in the application CPU 12 is accumulated inside and overheat may be caused.

For this, the upper heat sink 202 is attached to the application CPU 12 so that the heat generated in the application CPU 12 is absorbed by the upper heat sink 202 and the heat is radiated from the exposed portion of the upper heat sink 202. Thus, the heat generated in the application CPU 12 is dispersed so as to prevent local temperature increase, thereby preventing overheat.

Moreover, the heat absorbed by the upper heat sink 202 is also conducted to and absorbed by the lower heat sink 102 attached to the upper heat sink 202 so that the heat is also radiated from the exposed portion of the lower heat sink 102. This further disperses the heat to prevent local temperature increase, thereby preventing overheat.

It should be noted that the temperature detection circuit 13 is preferably arranged in the vicinity of the application CPU 12. Thus, it is possible to accurately detect the temperature of the application CPU 12 as the heat source. Moreover, it is possible to arrange a plurality of temperature detection circuits 13. This enables more accurate detection of the temperature.

It should be noted that the application CPU 12 is preferably arranged in the upper case 201. This is because when a user uses the mobile telephone according to the present embodiment, the user holds the lower case and the heat generated may cause an unpleasant feeling to the user. Moreover, the lower case 101 contains the battery 15 and the power supply circuit 16. In order to prevent deterioration by heat generation the application CPU 12 is preferably arranged at a position apart from these.

FIG. 3B is a cross-sectional view of the set in the open state. That is, the lower case 101 is made slide downward of the set and the set is in the open state. When the set is in the open state, the exposed surface of the upper heat sink 202 is increased and the heat radiation effect can be increased as compared when the set is in the closed state. Thus, it is possible to effectively radiate heat. Moreover, since the upper heat sink 202 is partially connected to the lower heat sink 102 even when the set is in the open state, the lower case 101 can continuously radiate heat.

Thus, by sliding the upper case 201 and the lower case 101 with respect to each other, the area of the heat radiation member exposed outside is changed as the sliding operation is performed. As shown in FIG. 3, the heat radiation member is contained inside when the upper case 201 and the lower case 101 are in the closed state and is exposed outside when the upper case 201 and the lower case 101 are in the open state.

It should be noted that the heat radiation member is preferably arranged at the rear surface of the display device 6 of the upper case 201. This is because the heat radiation member is contained inside when the set is in the closed state and is exposed outside when the set is in the open state, thereby increasing the heat radiation effect and enabling heat radiation when required. Moreover, this is the position that the user hardly touches and the user need not feel the unpleasant feeling caused by heat. Furthermore, arrangement apart form the battery 15 and the power supply circuit 16 arranged in the lower case 101 can prevent deterioration of these.

Figure 4:
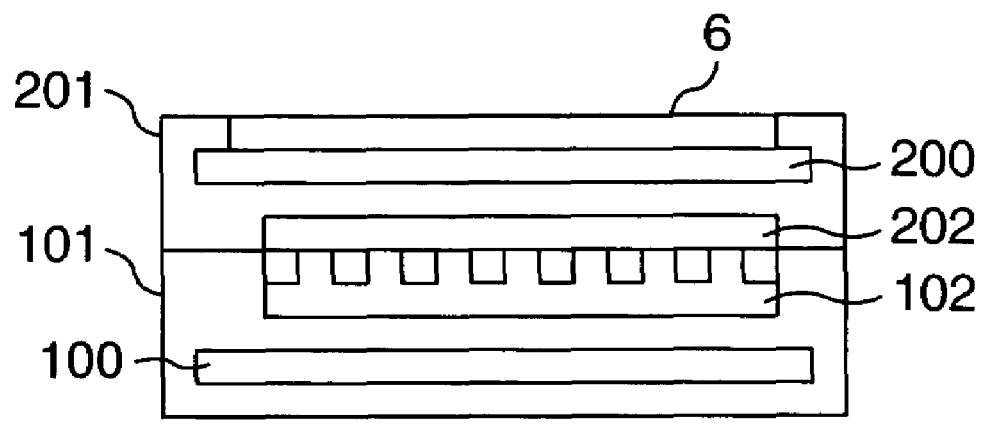
FIG. 4 is a cross-sectional view of the terminal device according to the first embodiment of this invention.

FIG. 4 is a cross-sectional view about (c)-(c') in FIG. 3B. As shown in FIG. 4, the upper heat sink 202 is engaged in with the lower heat sink through the form of rails. This is for serving as a slidable engagement section as well as a heat radiation mechanism having a greater surface area exposed outside. Thus, one structure realizes the slide mechanism and the heat radiation mechanism, thereby reducing the device size and weight. Moreover, a plurality of rail forms also increase the mechanical intensity of the case engagement portion. Furthermore, the surface area exposed outside is increased, thereby further improving the heat radiation effect. Moreover, here is given an example that the heat sink itself serves as the engagement portion. However, it is also possible to use a structure having an engagement portion for slidable engagement between the upper case 201 and the lower case 101.

Figure 5:
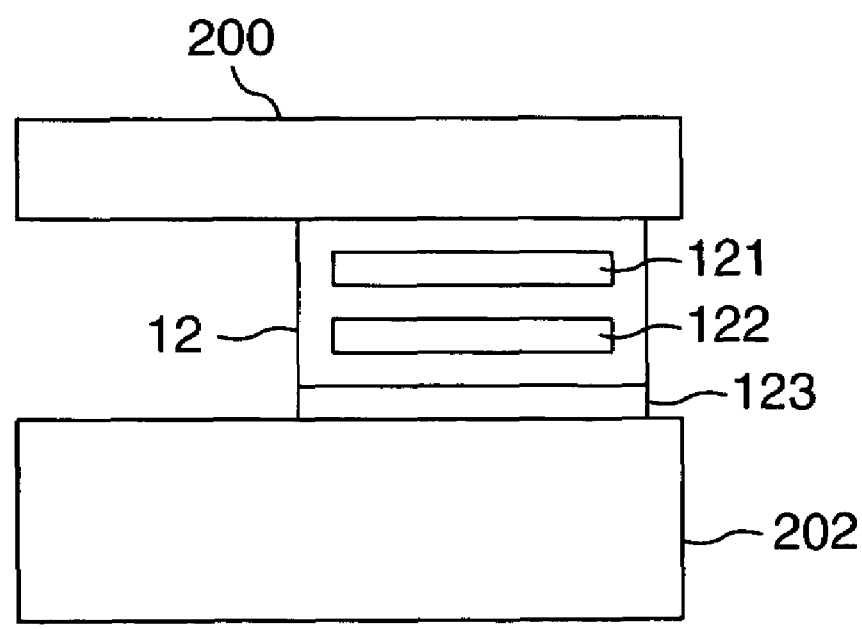
FIG. 5 is a cross-sectional view of an application CPU periphery of the terminal device according to the first embodiment of this invention.

FIG. 5 is an enlarged cross-sectional view of the engagement portion between the application CPU 112 and the upper heat sink 202. This figure shows a cross sectional view of the memory chip 121 and the CPU chip 122 mounted on the application CPU 12.

As shown in this figure, the memory chip 121 and the CPU chip 122 are stacked on the application CPU 12. The stack order is such that the CPU chip 122 having a greater heat generation amount than the memory chip 121 is arranged nearer to the upper heat sink 202. Thus, the heat generated by the CPU chip 122 is effectively conducted to the upper heat sink 202.

Moreover, by covering the gap between the package of the application CPU 12 and the upper heat sink 122 with a thermal conductive member 123, it is possible to further improve the heat radiation efficiency.

It should be noted that here one memory chip serves as a memory for storing a program of the application CPU 12 and a work memory for program execution. However, it is also possible to arrange two dedicated memory chips. The memory for storing the program may be a non-volatile memory such as a flush memory.

Moreover, the mountain portions of the upper heat sink 202, i.e., the portions where a user may touch by hands may be covered with a mesh member which hardly conducts heat. The mesh member can prevent direct touch of the heat sink by the user and can radiate heat through the mesh structure. Thus, it is possible to reduce the unpleasant feeling of the user by the heat, improve the safety, and maintain the heat radiation.

Moreover, explanation has been given on a case that the heat sink is arranged on the application CPU 112. However, it can also be arranged on the other heat generation part. For example, in the device type executing moving picture processing by the base band CPU 9 without using the application CPU 12, the heat sink may be attached to the base band CPU 9. That is, this invention can be applied not only to a mobile telephone having two CPU (base band CPU 9 and application CPU 12) but also to a mobile telephone having only one CPU.

Thus, it is possible to improve heat radiation efficiency of the CPU of the mobile terminal device and enables high-speed operation of the CPU for a long period of time, thereby enabling high-quality moving picture display.

Next, operation of the mobile telephone according to this invention will be described with reference to FIGS. 6A-6E and FIGS. 7A-7G. In this embodiment, explanation is given on the control to open the set so that heat is not accumulated inside when the temperature detection circuit detects a temperature exceeding a predetermined value or when a large load processing is executed for a predetermined time. FIGS. 6A-6E and FIGS. 7A-7G show display examples of the display device 6. More specifically, FIGS. 6A-6E show display examples of the telephone call processing when the load of the application CPU 12 is small. FIGS. 7A-7G shows the telephone call processing when the load of the application CPU is large.

Figure 6A:
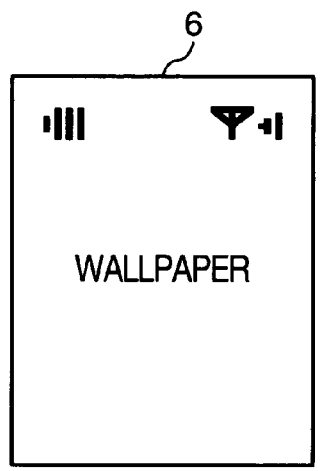
FIGS. 6A to 6E show display examples of a display device according to a second embodiment of this invention.
Figure 6B:
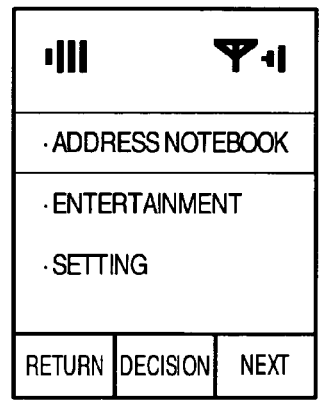
Figure 6C:
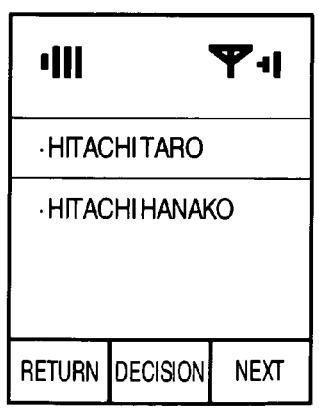
Figure 6D:
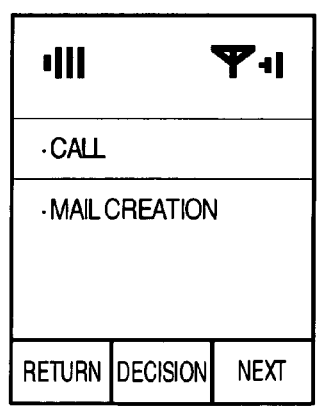

Firstly, explanation will be given on the operation of the telephone call processing when the load of the application CPU 12 is small with reference to FIGS. 6A to 6E. FIGS. 6A-6E show a case when the set is in the closed state as shown in FIG. 2A and a telephone call is made to an address registered in advance in the address notebook in the mobile telephone. When a decision key 72 is pressed in the wallpaper display state of FIG. 6A, the operation menu screen of FIG. 6B appears. In FIG. 6B, it is possible to select three menus "address notebook", "entertainment", and "setting" arranged in this order from the top. In the initial state, the "address notebook" is selected, which is notified to the user by hatching or a different background color.

When the downward key 73 is pressed once in this state, the "entertainment" which is one line below is selected and this is notified to the user by moving the hatching to the line of the "entertainment". When the upward direction key 71 is pressed, the operation is performed in the different direction from the aforementioned. Here, explanation will be given on the case when the decision key 72 is pressed in the state that the "address notebook" is selected as shown in FIG. 6B. By this operation, the address selection screen shown in FIG. 6C appears.

The address selection screen displays two addresses of "HITACHI Taro" and "HITACHI Hanako" registered in advance. The "HITACHI Taro" in the first line is selected in advance. "HITACHI Hanako" in the second line can be selected by pressing the downward direction key 73. Here, the decision key 72 is pressed while the "HITACHI Taro" in the initial state is selected and control is passed to the communication mode selection screen of FIG. 6D.

Figure 6E:
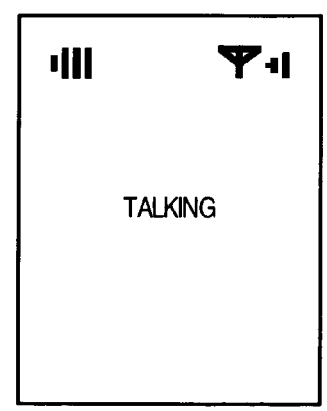

In this screen, menus of "call" and "mail creation" are displayed. The "call" is selected in the initial state. The "mail creation" can be selected by pressing the downward direction key 73. Here, the decision key 72 is pressed while the "call" in the initial state is selected and a telephone call is performed to "HITACHI Taro". When the destination partner receives the telephone call, the talking mode is set in. During talking, the sign of talking is displayed as shown in FIG. 6E.

In the aforementioned telephone call processing, the base band CPU 9 performs the processing while the application CPU 12 almost need not perform any processing. Moreover, in the telephone call processing, the calculation amount is small and heat generation is small, which in turn results in a small temperature increase. Accordingly, there is almost no need of opening the set and exposing the upper heat sink 202 outside. A series of operations can be performed while the set is closed as shown in FIG. 2A. Here, the application CPU 12 need not operate and it is possible to terminate its operation. Thus, the application CPU 12 is set to the low power consumption mode, thereby saving the power. In this case, display to the display device 6 may be performed directly from the base band CPU 9 via the CPU bus 8. Moreover, when the application CPU 12 has a function to internally connect the interface of the CPU bus 8 to the interface of the display device during the lower power consumption mode, the base band CPU 9 may pass through the inside of the application CPU and perform display to the display device 6. This further saves power.

Figure 7A:
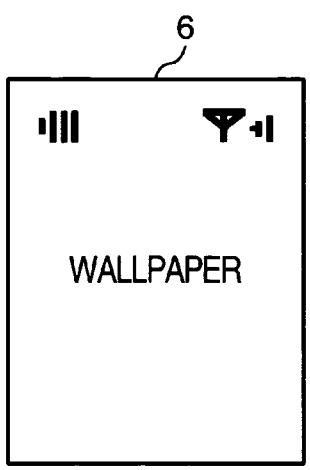
FIGS. 7A to 7G show display examples of a display device according to a third embodiment of this invention.
Figure 7B:
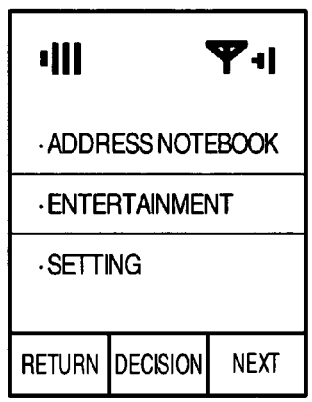
Figure 7C:
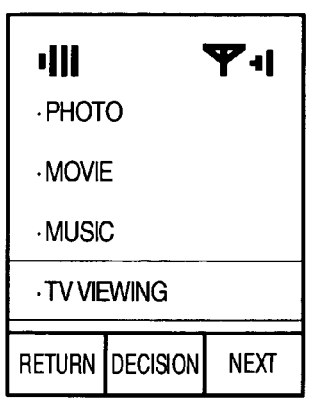
Figure 7D:
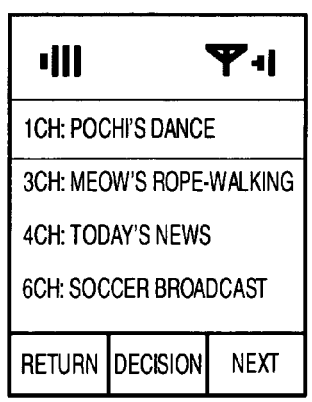

Explanation will be given on the operation of TV viewing which causes a large load on the application CPU 12 with reference to FIGS. 7A-7G. In case the decision key 72 is pressed when the device in the wallpaper display state as shown in FIG. 7A, the operation menu of FIG. 7B appears. In FIG. 7B, it is possible to select three menus of "address notebook", "entertainment" and "setting". In the initial state, the "address notebook" is selected. In this state, the downward direction key 73 is pressed once to select the "entertainment" one line below. Then, the decision key 72 is pressed in this state and the genre selection screen shown in FIG. 7C appears.

The genre selection screen displays four genres: "photo", "movie", "music" and "TV viewing". In the initial state, the "photo" in the first line is selected. The downward direction key 73 is pressed to select the "TV viewing" and the decision key 72 is pressed. Then the content selection screen of FIG. 7D appears.

Figure 7E:
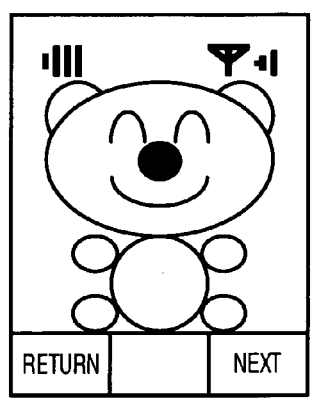
Figure 7F:
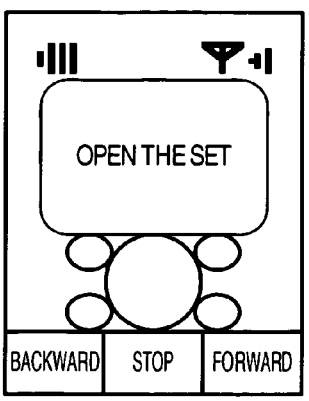

On this screen, combinations of the channel names and the program names are displayed such as "1CH: Pochi's dancing", "3CH: Meow's rope-walking", "4CH: Today's news", and "6CH: Soccer broadcast". Here, the decision key 72 is pressed while the "1CH: Pochi's dance" in the initial state is selected. Then, the TV viewing as shown in FIG. 7E starts. When the TV viewing is in a short time, heat generation is small and no problem is caused even though the set is closed. However, when the viewing has lasted for a long time such as 30 minutes or more, it is preferable that the set be opened to expose the upper heat sink 202 to increase the heat radiation effect. When the temperature detection circuit 13 arranged in the vicinity of the application CPU 12 detects a predetermined temperature, a message "open the set" appears so as to prompt the user to open the set. The display may be performed directly from the base band CPU 9 to the display device 6 or directly from the application CPU 12 to the display device. Furthermore, the display may be performed by passing through the inside of the application CPU 12. Moreover, in addition to the message displayed on the display screen, it is possible to reproduce audio through the loudspeaker or reproduce an alarm or warn by vibration. Thus, it is possible to surely issue an alarm to the user. Here, the "predetermined temperature" indicates a temperature at which the user starts to feel unpleasant feeling or the temperature which adversely affects operation of the application CPU 121 and the base band CPU 9. For example, 50 degrees C., 60 degrees C., 70 degrees C., 80 degrees C., 90 degrees C. or an intermediate value between these values.

Figure 7G:
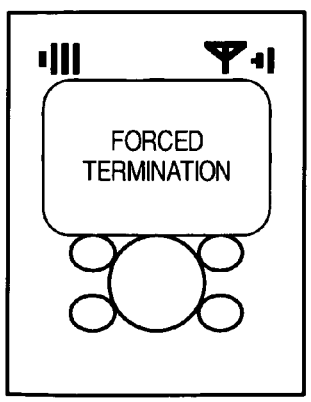

Moreover, when the user ignores the warning and does not open the set, a message "Forced termination" appears as shown in FIG. 7G and reception of the TV broadcast may be stopped or display on the display section may be interrupted.

In this case, it is preferable that the forced termination is performed when the set is not opened within a predetermined time after the waning of the forced termination is displayed. For example, it is possible to display a message "Forced termination after X seconds" may be displayed to count down. This prevents the case that the TV viewing is suddenly interrupted, thereby reducing the unpleasant feeling of the user. Moreover, it is possible to display again the message "Open the set" so as to prompt the user to open the set. Thus, the user can open the set and continuously view the TV.

When the user opens the set after these warnings, the warning disappears and the TV viewing can be performed. Moreover, when the user does not open the set after a series of warnings, it is possible to display a message "Set is opened to prevent overheat" and the set is forced to be opened. In this case, a signal to open the set is issued from the base band CPU 9 or the application CPU 12 and the open/close operation control section 18 receives the signal and operates to open the upper case and the lower case 101. More specifically, the open/close operation control section 18 makes the upper case slide against the lower case. For example, when a mechanism is provided for captively holding the both cases in the closed state, this mechanism is released and the cases are opened. Moreover, when a mechanism is provided for applying an external mechanical force to the cases, this is operated so that the external force is applied in the direction to open the cases. Thus, the set can be opened without requiring the user to perform a special operation, thereby improving the user-friendliness. Moreover, even when the user is apart from the mobile telephone when the warning is issued, the set is automatically opened and it is possible to prevent interruption of the TV view which gives user an unpleasant feeling.

It should be noted that explanation has been given on the case that a warning is displayed when the output of the temperature detection circuit 13 exceeds a predetermined value. However, it is also possible to display the warning to open the set when the "TV view" or the "movie" is selected in FIG. 7C. Thus, when performing a process requiring a large CPU load and causing a large heat generation amount, the user is prompted to open the set to increase the heat radiation effect in advance. Moreover, it is possible to configure software that the "TV view" and the "movie" cannot be selected or the moving picture content cannot be reproduced when the set is in the closed state. That is, the genre of application which can be executed is limited to a particular one according to the open/closed state of the set. This can surely prevent heat accumulation. Moreover, even when the temperature detection circuit 13 is not mounted, it is possible to prevent heat accumulation. Accordingly, there is an advantage of reducing the device size and the cost.

Moreover, by assuming that heat is accumulated when a predetermined time has elapsed after TV viewing is started, the aforementioned series of warning may be issued or the set open/close mechanism is operated to automatically open the set. This enables opening of the set before a predetermined temperature is reached, thereby surely preventing the heat accumulation. Furthermore, when the TV program viewed by the user lasts more than a predetermined time or the reproduction time of the moving picture data reproduced by the user exceeds a predetermined time, heat accumulation is expected and it is possible to issue the aforementioned series of warning or operate the set open/close mechanism to automatically open the set. Thus, it is possible to surely prevent heat accumulation. Moreover, even when the temperature detection circuit 13 is not mounted, it is possible to prevent heat accumulation and accordingly, it is possible to reduce the device size and the cost. It should be noted that data on the TV program broadcast time can be acquired by downloading the program data by the EPG. Moreover, in the case of digital broadcast, the data can be acquired by the broadcast time data contained in the broadcast data.

It should be noted that explanation has been given on the case that the output of the temperature detection circuit 13 and the output of the open/close detection circuit 14 are detected mainly by the base band CPU 9. However, the outputs can also be detected by the application CPU 12.

Description will now be directed to a mobile telephone according to a third embodiment of this invention.

In the aforementioned embodiment, the genre of the application which can be executed is limited by the open/close state of the set. In this embodiment, the operation frequency of the application CPU 12 is limited. Here, explanation will be given on the case that the operation frequency of the application CPU 12 is limited by reducing the image size treated.

Figure 8A:
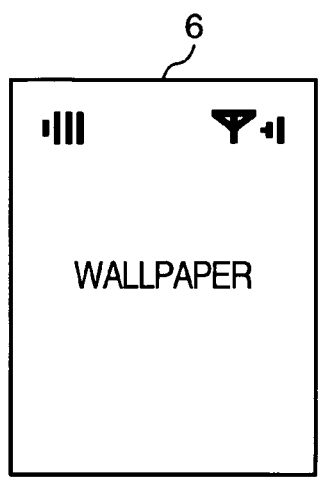
FIGS. 8A to 8E show display examples of a display device according to a fourth embodiment of this invention.
Figure 8B:
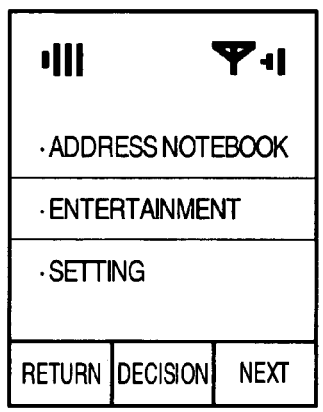
Figure 8C:
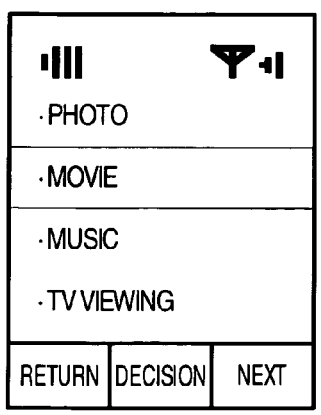
Figure 8D:
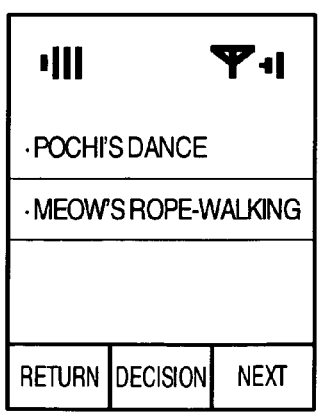
Figure 8E:
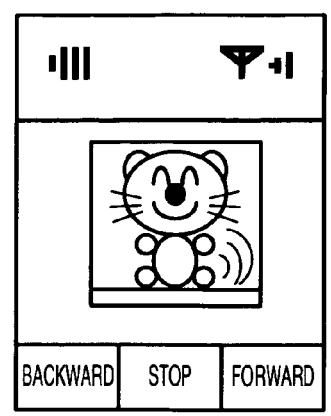

FIGS. 8A to 8E are examples of screen display on the display device 6 when the moving picture is reproduced while the set is in the closed state. FIGS. 8A to 8E show the case for reproducing the "Pochi's dance" and the "Meow's rope-walking" stored as the moving picture file. FIGS. 8A to 8C are almost identical to the aforementioned embodiment except for that the "movie" is selected in FIG. 8C. In FIG. 8D, the image size of the "Pochi's dance" is 240 pixels in the lateral direction×320 pixels in the vertical direction while the image size of the "Meow's rope-walking" is 120 pixels in the lateral direction×160 pixels in the vertical direction. The base band CPU 9 determines the open/close state of the set according to the output of open/close detection circuit 14 and notifies it to the application CPU 12. The application CPU 12 sets a low operation frequency by itself and sets so that reproduction of "Pochi's dance" is inhibited. Moreover, the application CPU 12 notifies this state to the user by indicating the characters of "Pochi's dance" together with the deletion line. Accordingly, what the user can select is only the "Meow's dance". When this is selected, as shown in FIG. 8E, only a small content having 120 pixels in the lateral direction×160 pixels in the vertical direction can be reproduced. That is, only the content which can be reproduced by the operation frequency of the limited application CPU 12 can be reproduced and a content requiring a large CPU load cannot be reproduced. This can prevent heat accumulation inside.

It should be noted that in this case, the deletion line is used to indicate that the "Pochi's dance" cannot be reproduced. However, the display is not limited to this. For example, the "Pochi's dance" may be excluded from the reproduction list or displayed with a different color or a light color so that it cannot be selected.

Moreover, explanation has been given on the case that the content image size is limited when the operation frequency of the application CPU 12 is limited. However, this invention is not limited to this. For example, a content having 30 frames per second may be reproduced with 15 frames per second, thus reducing the number of frames of the content per second.

On the other hand, when the set is in the open state, these operations are enabled regardless of the image size and the number of frames of the content. That is, it is possible to switch the operation that can be executed and limit the operation according to the set open/close state. Thus, when the set is in the open state and a large heat radiation effect can be obtained, the operation is not limited and when the set is in the closed state and only a small heat radiation effect can be obtained, the operation is limited so as to prevent overheat.

Thus, this invention can provide a mobile terminal device which can reduce heat accumulation.

It should be noted that explanation has been given on a case of a slide type mobile telephone but this invention can also be applied to various types of mobile telephone such as a collapsible type, a straight type, and a revolver type. Moreover, as has been described above, this invention can also be applied to various devices other than the mobile telephone.

The invention claimed is:

1. A mobile terminal device comprising:
   a first casing including a display unit;
   a second casing including an input unit, the first casing and the second casing being joined so as to be closable;
   a heat sink attached to the first casing at a rear side of the display such that a first portion of the heat sink is enclosed by the mobile terminal device when the first casing and the second casing are in a closed state, and the first portion of the heat sink is not enclosed by the mobile terminal device when the first casing and the second casing are in an open state;
   a temperature detector configured to detect a temperature of the first casing or the second casing;
   a memory configured to store a plurality of contents;
   an open/close detector configured to detects whether the first casing and the second casing are in the closed state; and
   a controller configured to inhibit reproduction of content stored in the memory if at least one of an image size or frame rate of the content exceed predetermined values when the first easing and the second casing are detected as being in the closed state, and
   the controller being further configured to allow reproduction of the content if the image size and frame rate do not exceed the predetermined values when the first casing and the second casing are detected as being in the closed state; and
   a controller is configured to cause the display unit to display a message if the temperature detected by the temperature detector exceeds a predetermined value when the first casing and the second casing are detected as being in the closed state.

2. The mobile terminal device according to claim 1, wherein an operating frequency of the controller is reduced when the open/close detector detects that the first casing and the second casing are in the closed state.

3. The mobile terminal device according to claim 1, wherein the controller causes the display unit to display a message indicating that reproduction of content exceeding the predetermined value of image size or the predetermined value of frame rate is restricted.

* * * * *